United States Patent [19]

Biere

[11] Patent Number: 5,788,859
[45] Date of Patent: Aug. 4, 1998

[54] SELF-EVACUATING WATER-SEPARATING FUEL FILTER

[75] Inventor: David A. Biere, Kearney, Nebr.

[73] Assignee: Baldwin Filters, Inc., Kearney, Nebr.

[21] Appl. No.: 644,701

[22] Filed: May 10, 1996

[51] Int. Cl.⁶ .................................................. B01D 35/16
[52] U.S. Cl. .................. 210/312; 210/433.1; 210/438; 210/440; 210/444; 210/450
[58] Field of Search .................................. 210/312, 313, 210/407, 433.1, 438, 444, 450, DIG. 17, 248, 449, DIG. 5

[56] References Cited

U.S. PATENT DOCUMENTS 5,078,877  1/1992  Cudaback et al. ............... 210/444
5,462,658  10/1995  Sem ................................ 210/312

Primary Examiner—Matthew O. Savage
Attorney, Agent, or Firm—Leydig, Voit & Mayer, Ltd.

[57] ABSTRACT

A spin-on water-separating fuel filter has a built-in central drain tube for providing a sump port at the connection end of the spin-on filter located near the fuel inlet and fuel outlet ports. Water removed from the fuel is collected in a sump at the base of the filter. The drain tube, supported in the bore of the filter element, has a sump end projecting into the sump, and an outlet end adjacent to and aligned with a central threaded opening at the connection end of the filter. The outlet end of the drain tube, self-centered near the threaded opening, has a captured gasket which forms the sump port. When the filter is installed on the mounting head, the outlet end of the drain tube is coupled to a short stub tube projecting from the center of the central threaded neck to form a sealed passage for evacuating water from the sump.

19 Claims, 6 Drawing Sheets

SELF-EVACUATING WATER-SEPARATING FUEL FILTER

FIELD OF THE INVENTION

This invention is generally related to fuel filters, and more particularly to fuel filters that remove water from the fuel being filtered.

BACKGROUND OF THE INVENTION

Most diesel engines require diesel fuel that is substantially water-free. Using diesel fuel that contains a substantial amount of water not only affects the performance of a diesel engine but also compromises its reliability and shortens its life. In order to avoid the ill effects of water-laden diesel fuel, fuel filters have been developed which remove water from the diesel fuel using specially treated filtering media. These specially treated filtering media have been shown to be highly effective, being able to remove almost all the free water and upwards of 97% of the emulsified water from the fuel stream. In such a water separating fuel filter, the water separated from the fuel coalesces on the surface of the filter medium and trickles down due to gravitational force, and is usually collected in a sump region at the base of the fuel filter.

Disposing of the water and other contaminants removed from the fuel is a related and important problem. If water is allowed to build up to exceed the capacity of the sump at the base of the filter, the water will ultimately contaminate the clean fuel supply. For example, eventually the extra water will overwhelm the water-removing capability of the filter media and will be picked up by the fuel stream and transported downstream to the diesel engine.

Some fuel filters are provided with petcocks at the base of the sump which can be manually opened to drain water. This approach of water draining is not completely satisfactory. First of all, it requires the operator to periodically service the fuel filter in order to keep it functional. Furthermore, a manually operated petcock is effective only if the operator uses it regularly before the sump overfills. One means for ensuring that the operator does not forget to drain the water when the sump is full is to use an electrical water sensing probe inserted into the sump region of the filter. The sensing probe can be connected to a warning light or a buzzer, which will be activated to alert the operator of the need for filter service when the water in the sump reaches a predetermined level. This approach, while preferable to less reliable alternatives, also has certain disadvantages. For example, the addition of a sensor on the filter can conceivably weaken the structural strength and integrity of the filter and also introduce potential leak paths. Moreover, adding the sensor and the electrical connection for the warning system increases not only the cost but also the complexity of the fuel filtering system.

Dual filter systems using two filters mounted vertically back to back have been proposed as a solution to provide a self-evacuating fuel/water separator. These systems are overly complex and have certain operating deficiencies not present in a single-filter system.

It has also been proposed to use a single-filter system in which a water sump is formed in the bottom of the fuel filter and connected to the engine for automatic draining by a long extraction tube which projects from the engine. That proposal includes a filter mounting head that has a long extraction tube projecting outwardly from a threaded neck for spin-on filter attachment. The spin-on filter is adapted to allow the long extraction tube to be inserted through the filter element into the sump region at the bottom of the filter, when the filter is properly mounted. During operation, the water in the sump region is pressurized by the fuel pressure in the filter to flow through the extraction tube, and is ultimately returned to the fuel tank. This proposed filter system allows self-evacuating of the water separated from the fuel without the problems encountered in the double-filter systems. There are disadvantages associated with this method, however. To extract water from the sump region at the bottom of the filter, the extraction tube has to be almost as long as the filter itself. This can pose an unexpected complication to the simplicity of the spin-on filter concept in which the gaskets and connections are all "automatically" made by the simple act of spinning the filter on a single threaded stud. Instead, the requirement of connecting a long tube to a sump at the base of the filter requires an extra degree of care and attention. Furthermore, the long protruding tube significantly increases the clearance required for mounting the spin-on filter, and such clearance may not be available if the filter is mounted in a crowded environment such as a crowded engine compartment. The length of the tube also makes it susceptible to accidental bending and even breaking during filter removal or installation. Due to the depth by which the tube is inserted into the filter, the filter and the tube have to be carefully aligned during installation. Even slight misalignment, which can be caused by, for example, a slightly bent tube, may compromise the integrity of the seals in the filter and can cause commingling of clean fuel with dirty fuel or the removed water.

SUMMARY OF THE INVENTION

In view of the foregoing, it is a primary object of the present invention to provide a spin-on fuel filter that is capable of automatic evacuating of water collected in a sump at the bottom of the filter without compromising the reliability and ease of spin-on filter installation.

It is a related object of the present invention to provide such a self-evacuating spin-on filter with connections for unfiltered fuel, filtered fuel, and evacuated water all at the filter top plate, so the connections are formed by normal spin-on installation.

It is another related object of the present invention to provide such a self-evacuating spin-on filter with a simple yet robust construction that is easy to assemble and inexpensive to manufacture.

According to these and other objects of the present invention, there is provided a spin-on fuel filter which utilizes a built-in central drain tube to provide a sealed water passage for self-evacuating of water from a sump at the bottom of the filter. The filter is configured for mounting on a filter mounting head that has a central threaded neck for spin-on filter connection and for conduction of filtered fuel, and a stub tube projecting from the center of the central threaded neck for conducting water away from the filter. The filter is enclosed in a cylindrical canister. A connection plate closes an open end of the canister, and has a central threaded boss for mating with the central threaded neck for spin-on connection, and is connected to a central port for passing filtered fuel. A cylindrical filter element is supported in the canister and provides an internal bore serving as a clean fuel passage. The sump is formed between the filter element and the closed end of the canister. The central drain tube is supported in, but fluidically isolated from, the bore of the filter element, and is coaxially aligned with and supported by the central threaded boss in the connection plate. The central drain tube has a sump end projecting into the water sump and an outlet end disposed adjacent to the central threaded opening. The outlet end of the drain tube is internally gasketed to form a water port for connection with the stub tube. The internal gasketing allows axial insertion of the stub tube and forms a sealing engagement therewith.

It is a feature of the present invention that a built-in central drain tube connects the sump at the bottom of the filter to a central water port close to the top of the filter. In this way, the three ports for unfiltered fuel, filtered fuel, and water are all located concentrically and adjacent to the open end of the filter, and these three ports are connected to corresponding fluid conduits in the mounting head by normal spin-on filter connection. Thus, the installation of the filter of the present invention is as easy and reliable as that of conventional spin-on filters. Furthermore, due to the proximity of the outlet end of the drain tube to the open end of the filter, only a short extraction tube on the mounting head is required to form a water extraction path with the drain tube for removing water from the sump, which minimizes the clearance required for installing the filter.

These and other objects and advantages of the invention will become more apparent from the following detailed description when taken in conjunction with the accompanying drawings.

Figure 1:
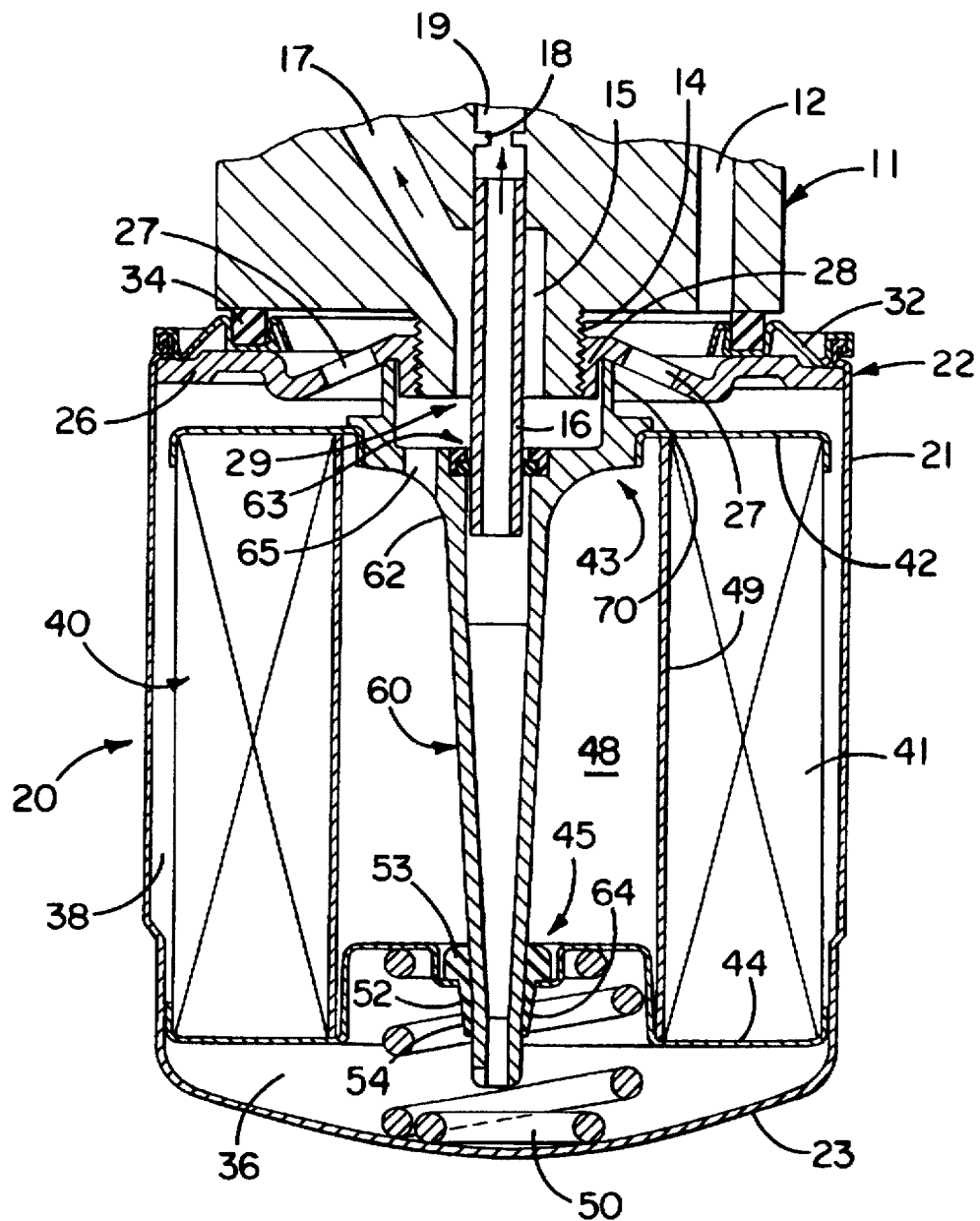
FIG. 1 is a cross-sectional view of a fuel filter exemplifying the present invention installed on a mounting head.

While the invention is susceptible of various modifications and alterative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration, the present invention is shown in the drawings in connection with a filter system for separating water from fuel, and sometimes known as a fuel/water separator. FIG. 1 shows the filter system as including a spin-on filter 20 mounted on a filter mounting head 11. Generally, according to an important feature of the present invention, the spin-on filter 20 has a built-in central drain tube 60 which forms a sealed water passage connecting a water sump 36 at the bottom of the filter to a sump port at the top of the filter. By virtue of this feature, the three ports of the filter for unfiltered fuel, clean fuel, and water removed from fuel, respectively, are all disposed adjacent to the open end 22, and the connections of the three ports with the respective fuel and water passages in the mounting head 11 are formed when the filter 20 is spun on the mounting head 11.

In more detail, the filter mounting head 11 has a threaded central neck 14 for spin-on connection. An unfiltered fuel conduit 12 supplies unfiltered fuel to the filter 20. Filtered clean fuel is conducted away from the filter via an aperture 15 in the threaded central neck 14 and a clean fuel outlet conduit 17. The mounting head further has a stub tube 16 projecting from the center of the threaded central neck 14. As will be described in greater detail below, the stub tube 16 is coupled to the drain tube 60 to provide a water passage for conducting water away from the filter. The stub tube 16 preferably is connected via a fuel return line to the fuel tank so that the water removed from the fuel is ultimately returned to the fuel tank. In the fuel tank, the water can be bound by an additive or otherwise disposed of.

The filter 20, like a conventional spin-on filter, is enclosed in a cylindrical canister 21 which preferably is a drawn metal housing. The canister has an open end 22 for fluid communication with the mounting head 11, and a closed end 23. The open end 22 is closed by means of a connection plate 26, which has a central threaded boss 28. The central threaded boss 28 has a thread size matching that of the threaded central neck 14 for spin-on filter connection. The central threaded boss also permits fluid connection to a central fuel outlet port 29 of the filter. In the illustrated embodiment, for securing the connection plate 26 in place, the canister 21 is mechanically lock-seamed to the connection plate by use of a seaming lid 32, which is welded to the connection plate 26. The cylindrical edge of the canister and a cylindrical edge of the seaming lid 32 are rolled together and over a shoulder of the connection plate 26 to securely lock the elements together. The seaming lid 32 also carries a captured gasket ring 34, preferably of nitrile rubber, which seals the fuel passages from the external environment after the filter is spun on the central threaded neck 14 to make a filter connection.

For removing water and suspended particles in the fuel, the filter has a cylindrical filter element 40 supported in the canister. A spring 50, which is preferably electrogalvanized for corrosion resistance, but which can include a plastic insulator to separate the filter medium from the canister, is interposed between a lower supporting plate 44 of the filter element and the bottom 23 of the canister. The outer periphery of the filter element 40 and the canister 21 forms an outer peripheral chamber 38 for receiving unfiltered fuel from the mounting head 11. Fuel passes through the filter element 40 to a central bore 48 which forms a filtered fuel passage. The filter element is supported and rigidified by a top cap 42 and a bottom cap 44 secured to the element as by bonding. Water removed from the fuel is collected in the sump 36 formed between the bottom cap 44 and the closed end 23 of the canister.

Figure 7:
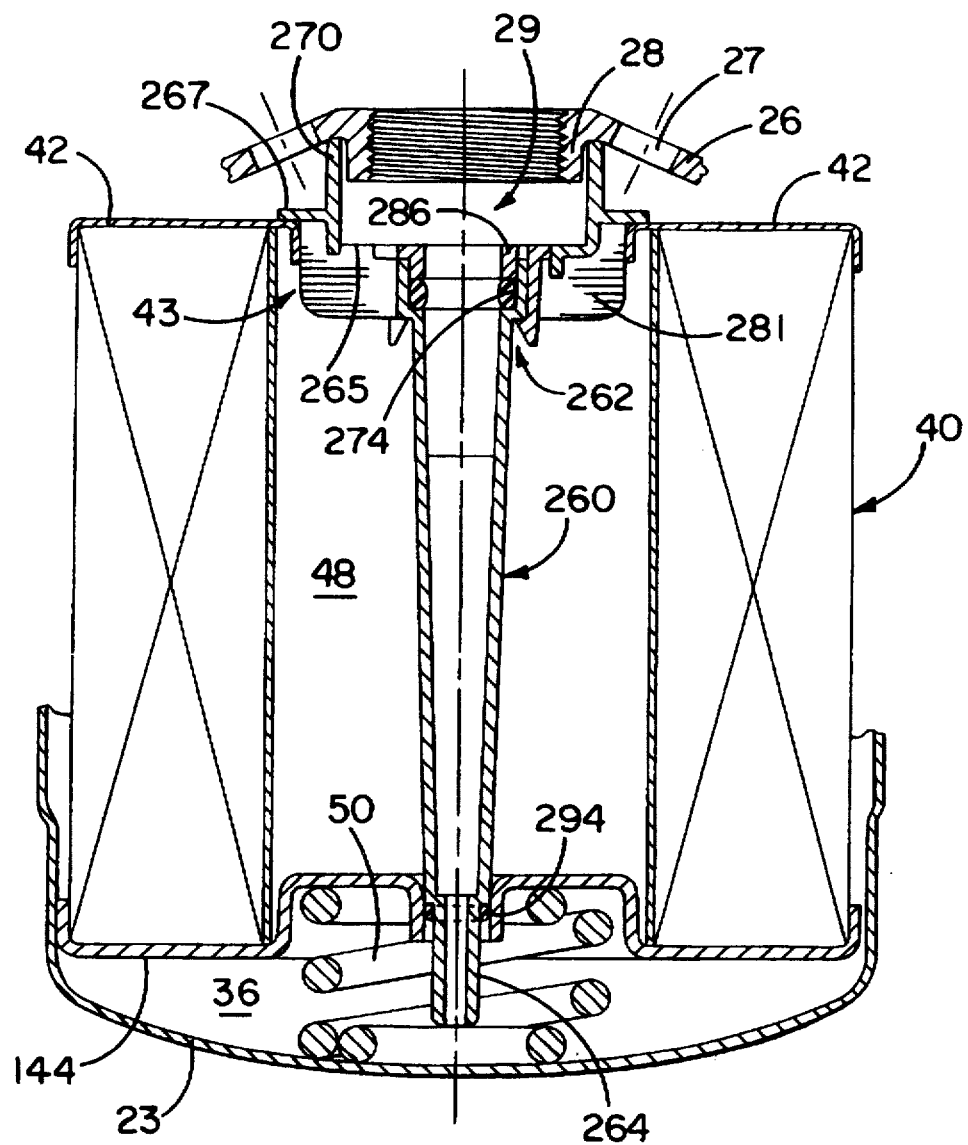
FIG. 7 is a cross-sectional view showing a currently preferred embodiment of a self-evacuating spin-on filter.
Figure 8:
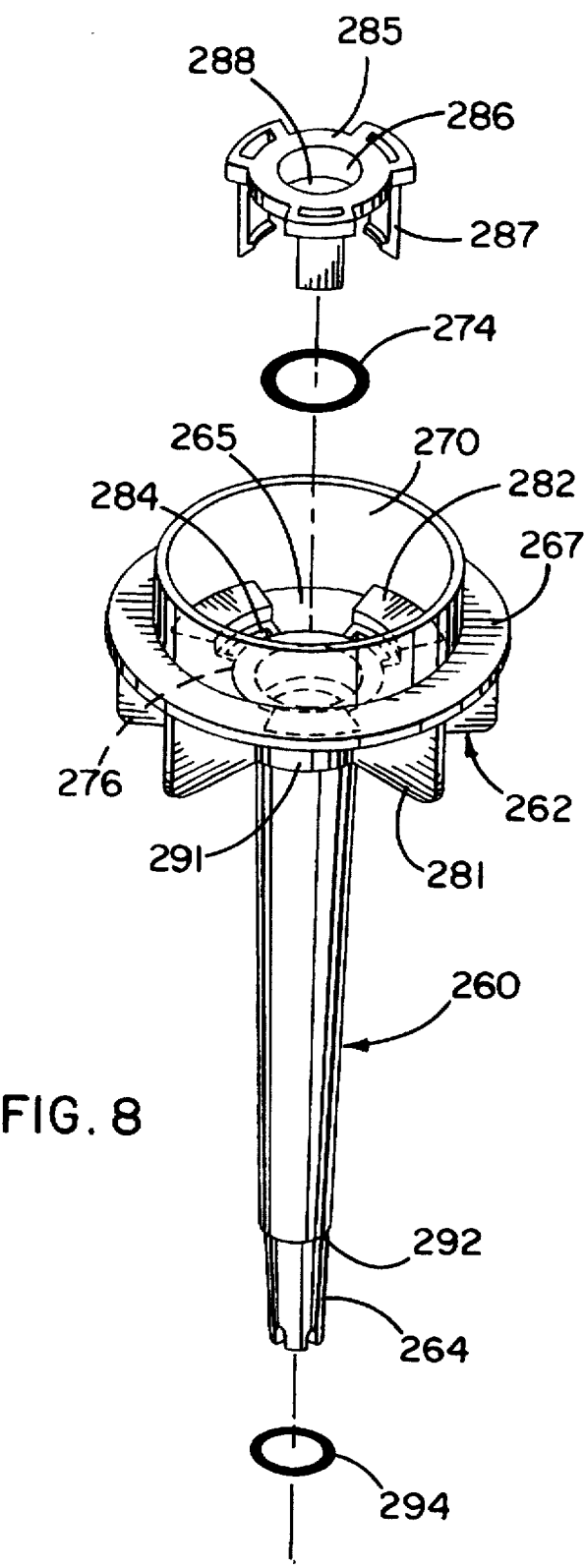
FIG. 8 is an exploded perspective view of the drain tube shown in FIG. 7.

In the preferred embodiment, the filter medium 41 used in the filter element 40 is a pleated cellulosic filter medium specially treated to preferentially repel both free and emulsified water. In FIG. 1, both the top cap 42 and the bottom cap 44 are of stamped steel. FIG. 7 shows a bottom cap 144 which is preferably of molded plastic. If desired, both caps 42 and 44 may be molded of plastic material, such as nylon. In the present embodiment, the filter element 40 also includes a inner support tube 49 of perforated metal for radial support of the filter medium.

To pass unfiltered fuel from the mounting head 11 into the outer peripheral chamber 38, the connection plate 26 is provided with an outer peripheral port 27 which in the present embodiment includes a plurality of inlet openings disposed around the central threaded boss 28. Thus, a cylindrical fuel inlet passage is formed between the mounting head and the filter, and is enclosed by the gasket 34 at the outer periphery and the threaded neck 14 at the inner periphery. The filtered clean fuel in the central bore 48 of the filter element is conducted to the mounting head 11 and its clean fuel outlet port 17, via the central port 29 adjacent the connection plate 26. Thus, as is conventional for spin-on filters, the connections for unfiltered and clean fuel are positioned adjacent the open end 22 of the filter 20 and are completed when the filter is spun onto the mounting head 11.

In accordance with an important feature of the present invention, a built-in central drain tube 60 is provided for evacuating the water in the sump 36. The central drain tube 60, supported in but fluidically isolated from the central bore 48 of the filter element, connects the sump 36 to a sump port near the open end of the filter. The central drain tube 60 has a small diameter sump end 64 projecting through a gasketed central aperture 45 in the bottom cap 44 into the sump 36 for extracting water therein. Opposite the sump end is an outlet end 62, which is aligned coaxially with the central threaded boss 28 and forms a port 63 for coupling with the stub tube 16 for water extraction.

The advantage of using a drain tube 60 is significant in that the sump port 63, like the outer peripheral port 27 for unfiltered fuel and the central port 29 for clean fuel, is also disposed adjacent to the open end 22 of the filter. These three ports, concentrically disposed and adjacent to the open end, are connected to the respective fluid conduits in the mounting head 11 when the filter is spun on the mounting head. Thus, the installation of the self-evacuating filter of the present invention is as easy as that of conventional spin-on filters. Furthermore, due to the proximity of the sump port 63 to the open end, the stub tube 16 can be kept short. This not only reduces the clearance required for installing the filter but also minimizes the likelihood of bending the stub tube 16 during filter removal and installation.

Figure 4:
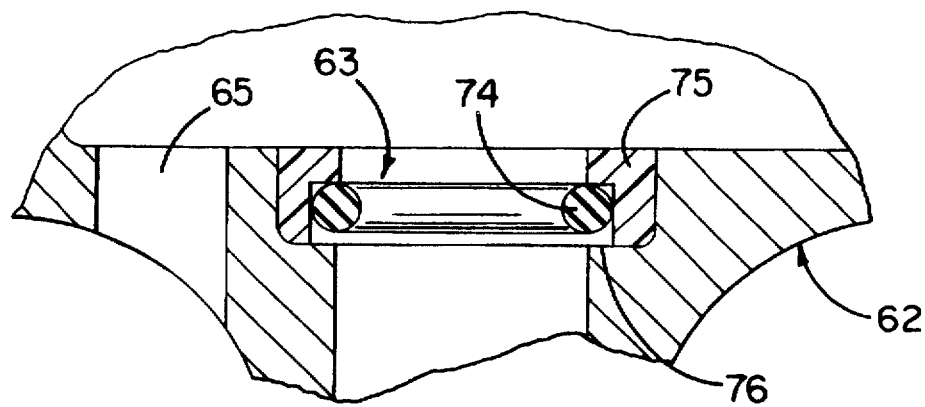
FIG. 4 is a partial sectional view of the drain tube of FIG. 2 showing a gasket in the tube outlet for receiving a stub tube on the mounting head.
Figure 5:
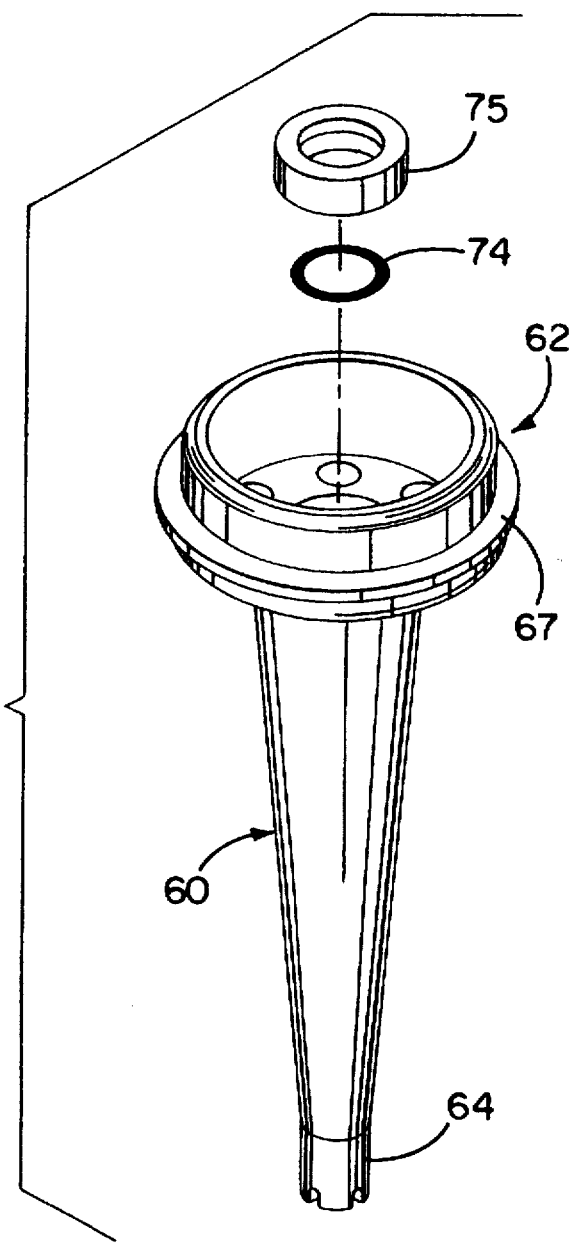
FIG. 5 is an exploded perspective view of the drain tube and the gasket of FIG. 1.

In order to properly couple the outlet end 62 to the stub tube 16, the outlet end is provided with an internal gasketing means which sealingly engages the stub tube when it is inserted into the outlet end. To facilitate spin-on filter connection, the internal gasketing means allows the stub tube 16 to move axially and to rotate within the outlet end 62 during filter installation, to form and complete a seal for isolating water in the drain tube 60 from the clean fuel passing through the central port 29. In the present embodiment, the internal gasketing means includes a captured O-ring 74 in the outlet end of the drain tube. As best seen in the enlarged sectional view of FIG. 4, the O-ring 74 is disposed coaxially within the outlet end 62 and is captured between an annular lip 76 in the inner periphery of the drain tube 60 and a retaining ring 75 press fit in the open end of the drain tube. This arrangement provides an annular channel for capturing the O-ring 74, allowing the stub tube to be inserted during filter installation without displacing the O-ring gasket, and allowing the filter to be removed without dislodging the O-ring gasket from the filter. An exploded perspective view of this embodiment of the internal gasketing means is shown in FIG. 5.

Figure 2:
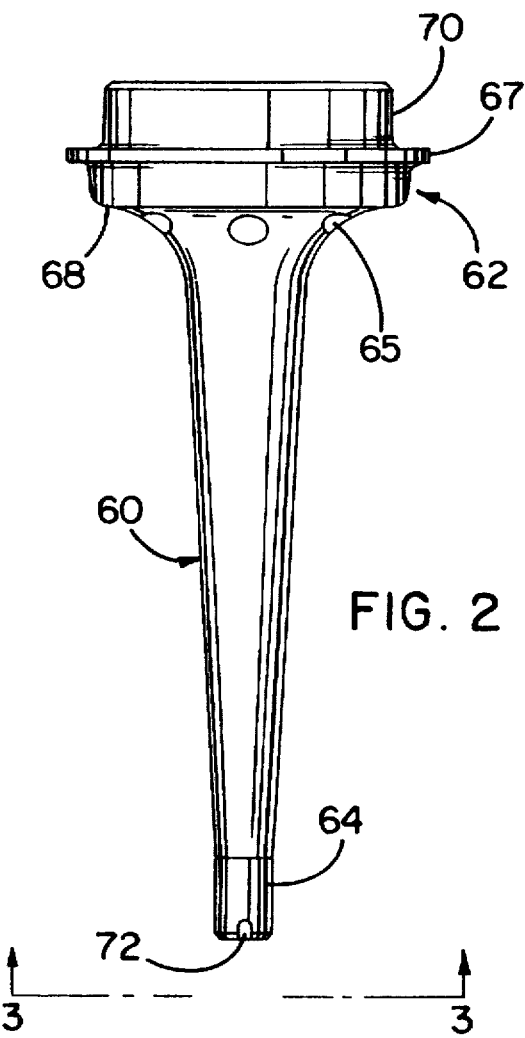
FIG. 2 is an elevation of a central drain tube used in the filter of FIG. 1.

In the present embodiment the outlet end 62 of the drain tube 60, as illustrated in FIGS. 1 and 2, has an enlarged portion which engages the central aperture 43 in the top cap 42. The enlarged portion includes a cylindrical flange 70 which fits over the central threaded boss 28 of the connection plate 26, for self-centering the drain tube with respect to the central threaded boss 28. This arrangement ensures that the stub tube 16, which is centered in the central threaded neck 14, will be inserted properly into the outlet end during spin-on filter installation. The enlarged portion also includes a shoulder 68 which engages the central aperture 43 in the top cap and centers the filter element 40 in the canister 21. The shoulder also positively locates the tube 60 with respect to the filter element 40 in the longitudinal direction. In this way, all the components inside the filter 20 are self-centered, contributing to the ease of assembly of the filter. Preferably, the material of the drain tube, which can be aluminum, but is preferably nylon, and the material of the top cap 42, which is preferably of stamped steel, provide an adequate seal to preclude unfiltered fuel from leaking through the cylindrical junction between the drain tube and the top cap. If desired, an additional gasket can be positioned between the shoulder of the center tube and its seat on the top cap.

To allow clean fuel in the central bore 48 of the filter element 40 to flow to the central port 29 adjacent the connection plate 26, and thence to the fuel outlet port 17, the enlarged portion of the outlet end 62 is provided with fuel outlet apertures 65 disposed between the captured O-ring 74 and the flange 70. The assembled relationship of the elements described thus far is maintained by spring means which loads the filter element towards the connection plate 26 to capture the flange 70 between the connection plate and the top cap. In the present embodiment, the spring means is a helical spring 50 disposed between the bottom cap 44 and the closed end 23 of the filter. The spring 50 is preferably electrogalvanized for corrosion protection. Thus, the spring 50 loads the bottom cap 44 upwardly which acts through the filter medium to the top cap to load the shoulder 67 of the center tube upwardly, forcing the upper rim of the flange 70 against the connection plate 26, while the flange 70 assures concentricity of the drain tube with the center of the filter. To the extent the contact between the rim of the flange 70 and the underside of the connection plate 26 is inadequate to maintain a seal between the inlet and outlet fuel chambers, a gasket can be interposed between those elements. However, particularly when using a nylon drain tube, and particularly when the fuel/water separator is used in pressurized side applications, no additional gasketing appears to be required.

Figure 3:
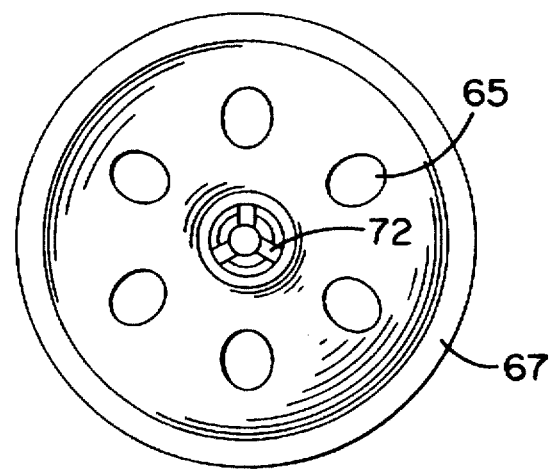
FIG. 3 is a bottom view of the drain tube taken generally along the line 3—3 of FIG. 2.

In order to prevent water in the sump 36 from leaking into the central bore 48, a gasket is interposed between the sump end 64 of the drain tube and the central aperture 45 in the bottom cap 44. In the present embodiment, the gasket is shown as a grommet 52 which has a stop ring portion 53 for engaging the bottom cap for locking the axial position of the grommet. A barrel portion 54 of the grommet extends from the stop ring portion 53 through the central aperture 45 in the bottom cap, and provides an axial aperture of a size for sealing fit with the sump end of the drain tube. To prevent clogging, the sump end 64 is provided with axial slots 72, which are best illustrated in FIG. 3. Due to the existence of the slots 72, it is less likely for a piece of solid contaminant to block completely the water flow from the sump.

Thus, when a filter as described in detail above is to be installed on an engine, it is simply necessary to position the filter assembly near the mounting head 11. The stub tube 16 is partially inserted into the sump connection at the upper end of the drain tube. The captured O-ring 74 resists the axial force of insertion of the stub tube 16, and allows partial entry. The filter is then rotated to engage the threads of the connection plate 26 with the threaded connection 14. The filter is rotated until the gasket 34 engages the mounting head. At that point all three connections to the filter are automatically made, i.e., the inlet fuel, the clean filtered outlet fuel and the sump, and all are isolatingly sealed from each other.

In operation, water separated from the fuel by the filter element 40 coalesces on the surface of the filter medium and is pulled down by gravitational force and collected in the sump 36. Because the stub tube is connected to a fuel line which leads back to the fuel tank, which is at atmospheric pressure, a pressure differential exists across the central drain tube 60. The pressure differential acts to continuously, and automatically, expel the water in the sump out of the filter through the water passage formed by the central drain tube 60 and the stub tube 16. In the absence of free water in the sump, fuel is returned to the tank. Because the rate at which water is collected in the sump is generally relatively low, it is desirable to limit the flow from the sump through the drain tube so that an excessive amount of fuel is not recycled. In the illustrated embodiment, an orifice 18 in the water outlet conduit 19 in the head 11 is used to restrict the rate of flow from the sump.

Figure 6:
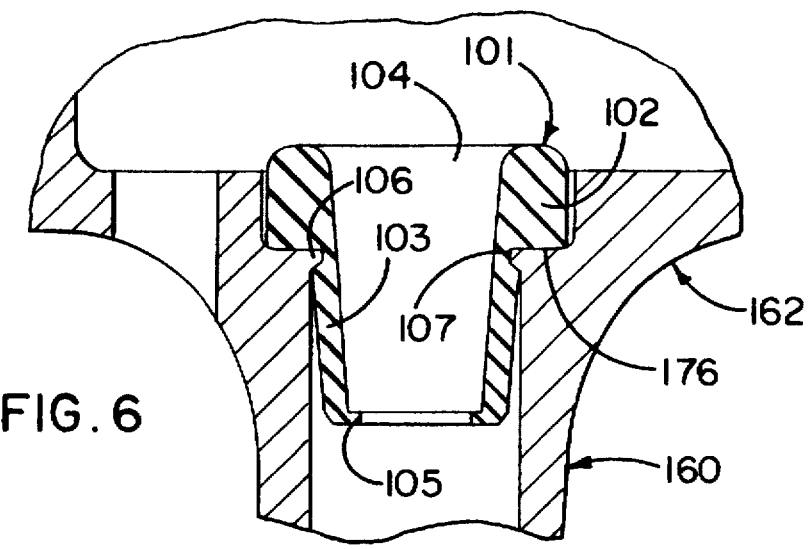
FIG. 6 is a cross-sectional view showing an alternative embodiment of a drain tube having a grommet disposed in its outlet end for receiving a stub tube on the mounting head.
Figure 9:
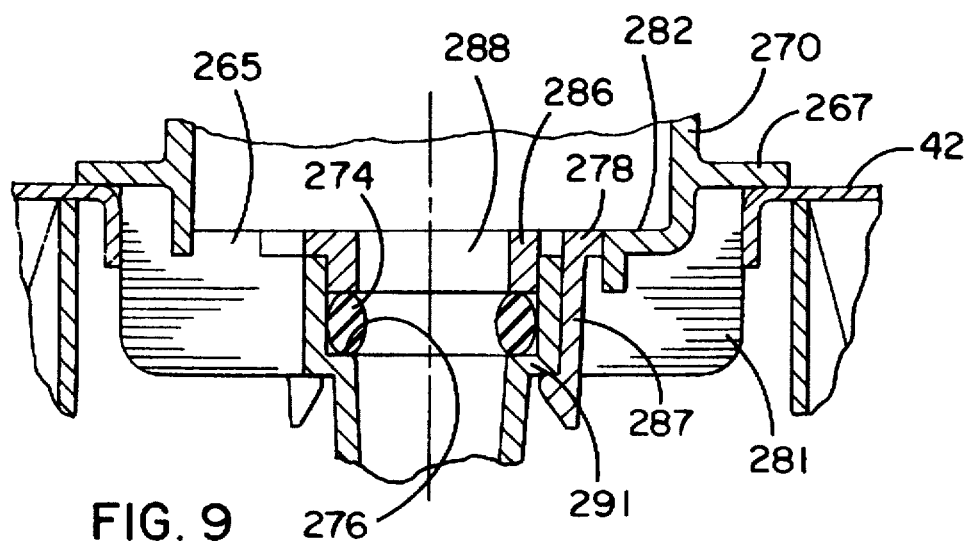
FIG. 9 is an enlarged partial sectional view showing the outlet end of the drain tube of FIG. 7 and illustrating a preferred internal tube gasket.
Figure 10:
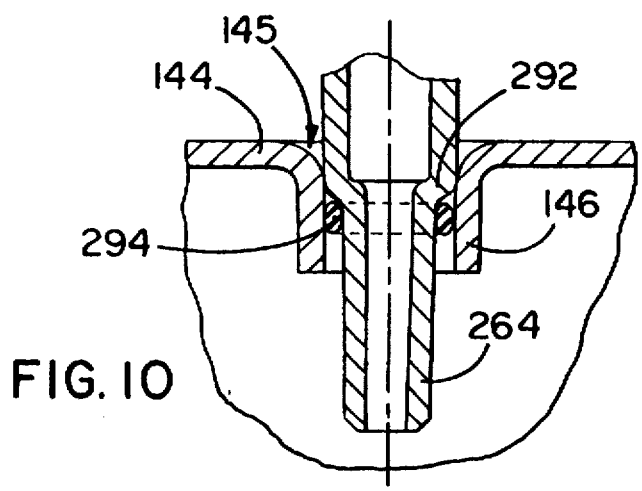
FIG. 10 is an enlarged partial sectional view showing the sump end of the drain tube shown of FIG. 7 projecting through a gasketed aperture in the bottom cap of a filter element.

An alternative embodiment of the drain tube is illustrated in the enlarged sectional view of FIG. 6. In this embodiment, the drain tube 160 is similar to the drain tube 60 shown in FIG. 1, but the internal gasketing means for receiving the stub tube 16 (FIG. 1) is shown to include a grommet 101. The grommet 101 has a stop ring portion 102 seated on an annular lip 176 on the inner periphery of the outlet end 162, and a barrel portion 103 extending into the aperture of the drain tube 160. The axial aperture 104 of the grommet 101 is sized for sealing engagement with the stub tube 16. A thin protruding annular lip 106 on the inside of the drain tube engages a slot 107 on the grommet to resist grommet removal when the filter is removed from the mounting head. An annular lip 105 at the end of the barrel portion 103 is provided to further ensure a water-tight sealing engagement with the stub tube.

Turning now to FIGS. 7–10, there is shown a currently preferred embodiment of the present invention. The embodiment has the operational and functional features of the embodiment of FIG. 1, but is preferred in providing a simpler construction for the drain tube and a preferred means for sealing both the sump and the sump port at the top of the filter. In greater detail, and similar to the embodiment shown in FIG. 1, the drain tube 260 has a small diameter sump end 264 extending into the sump 36, and an outlet end 262 with an enlarged portion. The enlarged portion includes a cylindrical flange 270 and an annular ledge 267 supported by six radial ribs 281 below the flange, and three spoke members 282 interposed between the ribs 281. The cylindrical flange 270 engages the central threaded boss 28 for self-centering the drain tube 260, and the ribs 281 engage the central aperture 43 of the top cap 42 for coaxial alignment with the filter element 40. Three large slots 265 interposed between the spokes 282 pass clean fuel in the central bore 48 to the central port 29. To fluidically isolate the clean fuel from the unfiltered fuel in the filter, the rim of the flange 270 forms a sealing contact with the connection plate 26, and the annular ledge 267 engages the top cap 42 to form another sealing contact. Separate gaskets can be utilized if necessary.

In the present embodiment, the internal gasketing means for providing a sump port at the top of the filter for receiving the stub tube 16 (FIG. 1) is an O-ring 274 captured in the outlet end 262, by means of a keeper 285. As can be best seen in the exploded perspective view of FIG. 8, the keeper 285 has a central boss 286 with a central aperture 288 which has a diameter slightly larger than the stub tube 16. The keeper further has three axially extending snap-fit tabs 287. To capture the O-ring in the outlet end 262, the O-ring 274 is first seated on an annular lip 276 in the drain tube near the outlet end (see FIG. 9), and the keeper 285 is installed by inserting the snap-fit tabs 287 through the slots 284 in the spoke members 282. When the keeper 285 is installed in position, the snap-fit tabs 287 lockingly engage an annular shoulder 291 on the outer periphery of the drain tube, and the O-ring is captured in the annular groove formed between the annular lip 276 and the annular boss 286 of the keeper. In this embodiment, preferably both the drain tube and the keeper are made of nylon, preferably injection molded nylon.

To seal the sump 36 from the central bore 48 of the filter element, an O-ring 294 is interposed between the sump end 264 of the drain tube 260 and the central aperture 145 in the bottom cap 144 of the filter element. As can be best seen in the enlarged sectional view of FIG. 10, the bottom plate 144 has a central boss 146 surrounding the central aperture 145. The O-ring 274 is interposed and compressed between the sump end 264 and the central boss 146, and engages an annular shoulder 292 on the sump end of the tube, which prevents the O-ring from moving upward when the sump end is inserted through the aperture 145 during filter assembly. As noted earlier, the bottom cap 144 is preferably of molded nylon, and with the O-ring 294 sealingly engages with the sump end of the drain tube. However, it is also possible, particularly in the case of cost reduction, to form the lower plate 144 of stamped steel, as in the prior embodiment.

It will be appreciated now that what has been provided is a self-evacuating spin-on filter which maintains the simplicity of operation of a conventional spin-on filter. In addition to conventional inlet and outlet ports at the top of the filter, a central drain tube supported in the internal bore of the filter, and fluidically isolated from the central bore, connects a sump passage at the base of the filter to a sump port at the filter top. A short stub tube is added to the filter mounting, and during spin-on assembly, the stub tube is inserted into a resilient gasket forming the sump port, whereupon the filter is simply spun into sealing engagement with the engine mount to complete the inlet, outlet and sump connections.

What is claimed is:

1. A fuel filter system comprising the combination of:
   a filter mounting head having a central threaded neck for spin-on filter connection, the mounting head having an unfiltered fuel conduit, an aperture in the central threaded neck for passing filtered fuel, and a short stub tube in the center of the threaded neck for water passage;
   a spin-on fuel filter including:
      a cylindrical housing having a closed end and a connection plate closing an open end thereof, the connection plate having a threaded central aperture fitting the central threaded neck for spin-on connection;
      a cylindrical filter element supported in the housing to form an outer peripheral chamber for receiving unfiltered fuel and a central bore for filtered fuel, and a sump between the filter element and the closed end of the housing for collecting water removed from the fuel;

the connection plate having an outer peripheral port for fluidically connecting the outer peripheral chamber to the unfiltered fuel conduit and a fuel outlet port for fluidically connecting the central bore to the aperture in the central threaded neck, and a central drain tube having a central sump port for fluid connection to the stub tube for evacuating water from the sump, said three ports being positioned near the open end of the housing for connection to the mounting head when the filter is spun on the central threaded neck; sealing means for removably sealing the central support of the central drain tube to the short stub tube;

the central drain tube being imperforate and supported in the bore of the filter element for forming a fluidically sealed passage connecting the sump to the sump port, the passage being isolated from the clean fuel in the central bore.

2. A fuel filter system according to claim 1, wherein the sealing means comprises the central sump port including an outlet end of the drain tube having internal gasketing means for sealingly receiving the stub tube when the filter is spun on the mounting head.

3. A fuel filter system according to claim 2, wherein the internal gasketing means is an O-ring captured in an internal annular groove in the outlet end.

4. A fuel filter system according to claim 3 wherein the central drain tube includes an enlarged cylindrical flange supported on the threaded central aperture of the connection plate for self-centering the drain tube, a cylindrical shoulder projecting from the enlarged flange and engaging an upper end cap on the filter element, and passages through the enlarged flange passing filtered fuel from the central bore to the fuel outlet port.

5. A fuel filter system according to claim 3 wherein the cylindrical filter element includes an upper end cap for supporting the central drain tube and a lower end cap having gasket means for providing fluidic isolation between the sump port and the central bore.

6. A fuel filter configured for installation on a filter mounting head which has a threaded neck of a given thread size for spin-on filter connection and a short stub tube projecting from the center of the threaded neck having a given diameter, the fuel filter comprising the combination of:

a canister having a closed end and an open end;

a cylindrical filter element supported in the canister forming an outer peripheral chamber for receiving unfiltered fuel and having an internal bore for filtered fuel;

a connection plate for closing the open end of the canister having a central threaded boss of said given thread size for spin-on filter connection, a central port for passing filtered fuel from the internal bore, and an outer peripheral port for supplying unfiltered fuel to the outer peripheral chamber;

a sump between the filter element and the closed end of the canister for collecting water removed from fuel;

a central drain tube supported in the internal bore of the filter element defining a passage fluidically isolated from the internal bore, the central drain tube having a sump end projecting into the sump and an outlet end adjacent to and coaxial with the central threaded opening; and means for internally gasketing the outlet end of the drain tube for forming a sump port near the connection plate, the internal gasketing means being of a size adequate for allowing axial insertion of and sealing engagement with a stub tube of said given diameter.

7. A fuel filter according to claim 6, wherein the internal gasketing means includes an O-ring captured in an internal annular groove in the outlet end of the central drain tube.

8. A fuel filter according to claim 7, wherein the O-ring is captured in the outlet end between an internal annular lip and a keeper forming a cylindrical slot with the lip for resisting axial thrust on the O-ring on insertion or removal of the stub tube having a central boss for insertion into the outlet end to capture the O-ring and side tabs for locking engagement with an outer periphery of the drain tube.

9. A fuel filter according to claim 8 wherein the keeper is a cylindrical member having an outer periphery fitting an aperture in the central tube, and an overlying lip for forming the cylindrical slot.

10. A fuel filter according to claim 8 wherein the keeper is a snap fit member having a central boss for insertion into the outlet end to capture the O-ring and side tabs for locking engagement with an outer periphery of the drain tube.

11. A fuel filter according to claim 8, wherein the filter element has top and bottom caps, and the sump end of the drain tube extends through a gasketed central aperture in the bottom cap into the sump.

12. A fuel filter according to claim 11, wherein the outlet end of the drain tube has an enlarged portion including a radially extending shoulder for engaging a central aperture in the top cap of the filter element, the enlarged portion having an axially extending cylindrical flange for engaging the central threaded boss on the connection plate for self-centering the central drain tube.

13. A fuel filter according to claim 12, wherein the enlarged portion of the outlet end has passages located between the internal gasketing means and the cylindrical flange for passing clean fuel from the bore of the filter element to the central port.

14. A fuel filter according to claim 12, including spring means for loading the filter element towards the connection plate for capturing the cylindrical flange between the connection plate and the top cap.

15. A fuel filter according to claim 6, wherein the drain tube is injection molded nylon.

16. A fuel filter for installation on a filter mounting head which has a threaded central neck of a given thread size for spin-on filter connection, the threaded neck having an aperture for passing filtered fuel and a short stub tube of a given diameter projecting from the threaded central neck for evacuating water, the fuel filter comprising the combination of:

a metallic cylindrical housing having a closed end and an open end;

a cylindrical filter element supported in the cylindrical housing to form an outer peripheral chamber for receiving unfiltered fuel and a central bore for filtered fuel, the filter element having top and bottom caps and forming a sump between the bottom cap and the closed end of the housing for collecting water removed from the fuel;

a connection plate for closing the open end of the housing and having a central threaded boss of said given thread size for spin-on connection, a central port for passing filtered fuel from the bore, and an outer peripheral port for supplying unfiltered fuel to the outer peripheral chamber;

a central drain tube extending through the bore of the filter element and supported in said caps thereof for providing a passage from the sump to a sump port near the connection plate, the passage fluidically isolated from the bore of the filter element;

the central drain tube having a small diameter sump end for projecting through a gasketed central aperture in the bottom cap into the sump, and an outlet end having an enlarged portion engaging a central aperture in the top cap, the enlarged portion including a cylindrical flange engaging the central threaded boss in the connection plate for self-centering the central drain tube;

spring means loading the filter element towards the connection plate to capture the cylindrical flange between the connection plate and the top cap;

a captured gasket at the outlet end of the drain tube forming the sump port and being of a size adequate to allow insertion of a stub tube of said given diameter for fluid communication with the sump; and apertures in the enlarged portion of the drain tube between the captured gasket and the cylindrical flange for passing filtered fuel from the bore to the central port.

17. A fuel filter according to claim 16, wherein the drain tube is of injection molded nylon.

18. A fuel filter according to claim 16, wherein the captured gasket is an O-ring disposed in an annular groove in the outlet end formed between an internal annular lip and a retaining means.

19. A fuel filter according to claim 18, wherein the retaining means is a keeper having a central boss for insertion into the outlet end of the drain tube to capture the O-ring and snap-fit tabs for locking engagement with a shoulder on the outer periphery of the drain tube.

* * * * *